(12) United States Patent
Maini

(10) Patent No.: US 12,503,997 B2
(45) Date of Patent: Dec. 23, 2025

(54) ROTATING AIRFOIL FOR SUSTAINING LIFT AND METHOD FOR GENERATING LIFT

(71) Applicant: Maini Renewables Private Limited, Mumbai (IN)

(72) Inventor: Swati Maini, Mumbai (IN)

(*) Notice: Subject to any disclaimer, the term of this patent is extended or adjusted under 35 U.S.C. 154(b) by 0 days.

(21) Appl. No.: 18/261,691

(22) PCT Filed: Jan. 17, 2022

(86) PCT No.: PCT/IN2022/050036
§ 371 (c)(1),
(2) Date: Jul. 17, 2023

(87) PCT Pub. No.: WO2022/153338
PCT Pub. Date: Jul. 21, 2022

(65) Prior Publication Data
US 2024/0068441 A1 Feb. 29, 2024

(30) Foreign Application Priority Data
Jan. 16, 2021 (IN) .............................. 202021054827

(51) Int. Cl.
*F03D 3/06* (2006.01)
*B63H 1/26* (2006.01)
(Continued)

(52) U.S. Cl.
CPC .............. *F03D 3/061* (2013.01); *F03B 3/121* (2013.01); *F03D 1/0633* (2013.01);
(Continued)

(58) Field of Classification Search
CPC .... F03D 1/0633; F03D 1/0641; F03D 1/0642; F03D 1/0643; F03D 1/0645;
(Continued)

(56) References Cited

U.S. PATENT DOCUMENTS

| 4,408,958 A | * | 10/1983 | Schacle | ................. F03D 1/0641 |
| | | | | 416/235 |
| 5,997,252 A | * | 12/1999 | Miller | ..................... F03D 3/005 |
| | | | | 416/DIG. 4 |

(Continued)

FOREIGN PATENT DOCUMENTS

| EP | 3760858 A1 | 1/2021 |
| KR | 10-2015-0106347 A | * | 9/2015 |
| WO | WO-2011153202 A2 | * | 12/2011 | ............... F03D 3/02 |

OTHER PUBLICATIONS

English machine translation of KR-10-2015-0106347-A, Feb. 9, 2024.*

(Continued)

*Primary Examiner* — Christopher Verdier
(74) *Attorney, Agent, or Firm* — Carlson, Caspers, Vandenburgh & Lindquist, P.A.

(57) ABSTRACT

Described herein is a rotor blade assembly (100) and a method for generating a lift in a fluid installation. The rotor blade assembly includes an arcuate rotor blade (102) that is configured to be rotated about its axis Y. One or more motion transmitting members (106, 114, 116) are provided that connect the arcuate rotor blade with at least one power generating member (104) for transmitting torque from the arcuate rotor blade to the at least one power generating member (104). The fluid incident on the arcuate rotor blade is caused to flow over a first leading edge L1 of a rotor blade towards a central rib R of the rotor blade (102). This fluid flow is then caused to flow along the central rib R of the rotor blade towards a stem section of the rotor blade from where the fluid exits, thereby causing rotation of the rotor blade.

14 Claims, 18 Drawing Sheets

(51) Int. Cl.
*F03B 3/12* (2006.01)
*F03D 1/06* (2006.01)
*F03D 3/00* (2006.01)

(52) U.S. Cl.
CPC ......... *F03D 1/0641* (2013.01); *F03D 1/0642* (2023.08); *F03D 1/0643* (2023.08); *F03D 1/0645* (2023.08); *F03D 1/0647* (2023.08); *F03D 1/0649* (2023.08); *F03D 1/0679* (2023.08); *F03D 3/005* (2013.01); *F03D 3/011* (2023.08); *B63H 1/26* (2013.01); *F05B 2240/212* (2013.01); *F05B 2240/30* (2013.01); *F05B 2240/301* (2013.01); *F05B 2240/303* (2020.08); *F05B 2240/304* (2020.08); *F05B 2240/306* (2020.08)

(58) Field of Classification Search
CPC .... F03D 1/0647; F03D 1/0649; F03D 1/0679; F03D 3/005; F03D 3/011; F03D 3/061; F03B 3/121; F05B 2240/212; F05B 2240/30; F05B 2240/301; F05B 2240/303; F05B 2240/304; F05B 2240/306; B63H 1/26; B64C 3/10; B64C 3/14; B64C 21/00

See application file for complete search history.

(56) References Cited

U.S. PATENT DOCUMENTS

| | | |
|---|---|---|
| 7,396,212 B1 | 7/2008 | Parker et al. |
| 2008/0217924 A1* | 9/2008 | Boone ..................... F03D 3/067 290/55 |
| 2011/0042962 A1* | 2/2011 | Yoon ...................... F03D 3/062 290/55 |
| 2017/0089322 A1* | 3/2017 | Liu ........................... F03D 1/06 |
| 2021/0363887 A1* | 11/2021 | Govindan .............. F01D 5/141 |

OTHER PUBLICATIONS

Indian Patent Office (ISA), "International Search Report", App. No. PCT/IN2022/050036, Mar. 30, 2022, 3 pgs.

Indian Patent Office (ISA), "Written Opinion of the International Searching Authority", App. No. PCT/IN2022/050036, Mar. 30, 2022, 5 pgs.

* cited by examiner

ROTATING AIRFOIL FOR SUSTAINING LIFT AND METHOD FOR GENERATING LIFT

This application is a national phase application, filed under 35 U.S.C. § 371, of International Patent Application No. PCT/IN2022/050036, filed on Jan. 17, 2022, which claims the benefit of Indian Application No. 202021054827, filed Jan. 16, 2021.

TECHNICAL FIELD

The present subject matter in general relates to airfoils and in particular relates to rotating airfoils for sustaining lift in rotors that are employed in diverse applications, such as energy generation and propulsion.

BACKGROUND

Airfoils are responsible for generating lift or drag in an object. When an airplane, propeller or turbine moves through a fluid, the airfoil in the blade or tail of the airplane or in the blade of the propeller or turbine produces the desired lifting force that acts perpendicular or parallel to the stream of fluid. Airfoils may be categorized as symmetrical airfoils, in which the curvatures of surfaces above and below the chord line are the same, and non-symmetrical airfoils in which curvatures of surfaces above and below the chord line are different.

Generally, rotating turbines and propellers are derived from NACA airfoils. However, such airfoils are designed to be suitable for straight and level flight, and do not address the issues of rotating objects. With the advancement in renewable energy installations including fluid turbine systems, such as wind and hydro turbine installations, it is important to improve performance of such installations by enhancing their rotor blade efficiency and at the same time overcoming challenges in operation, installation, and maintenance of such installations. Further, the surface features in traditional turbine blades are usually smooth, thereby resulting in compromised aerodynamic efficiency. Furthermore, propellers used for air and water travel, such as airplanes, ships, boats etc. require continuous improvement.

Therefore, there is a well felt need for an airfoil and associated turbines or propellers that overcome the above and other challenges faced in the industry due to drawbacks in conventional airfoils.

SUMMARY

It is an object of the present subject matter to provide a rotating airfoil for sustaining lift.

It is another object of the present subject matter to improve performance of energy generation systems and propulsion systems.

It is yet another object of the present subject matter to provide improved and cost-effective airfoil for propeller and/or turbine blades.

It is yet another object of the present subject matter to enhance rotational efficiency of rotating systems employed, for example, in fluid turbine systems comprising but not limited to wind and hydro turbine installations and in vehicles comprising but not limited to airplanes and ships.

It is yet another object of the present subject matter to enhance aerodynamic efficiency of rotating systems employed, for example, in fluid turbine systems comprising but not limited to wind and hydro turbine installations and in vehicles comprising but not limited to airplanes and ships.

It is yet another object of the present subject matter to enhance the overall efficiency of rotating systems employed, for example, in fluid turbine systems comprising but not limited to wind and hydro turbine installations and in vehicles comprising but not limited to airplanes and ships.

It is yet another object of the present subject matter to reduce installation and maintenance cost in a rotor-based system.

It is yet another object of the present subject matter to provide airfoils having autorotation and rapid fluid displacement as well as retardation feature.

It is yet another object of the present subject matter to provide airfoils that can be employed in vertical and/or horizontal fluid turbines.

It is yet another object of the present subject matter to provide airfoils that can be employed in propellers for air and water travel.

It is yet another object of the present subject matter to provide airfoils that address challenges involved with rotating objects such as rotor blades and propellers.

It is yet another object of the present subject matter to reduce the drag generated during operation of rotor blades.

It is yet another object of present subject matter to increase surface drag to induce vortical airflow to cause the airfoil to lift.

The present subject matter provides an airfoil that can be employed for energy generation and/or propulsion. The airfoil according to the present invention is most suitable for rotating systems comprising but not limited to turbines and/or propeller blades. In a preferred embodiment, the airfoil of the present subject matter comprises a rotating airfoil for use in vertical or horizontal wind or other fluid turbines. The rotating airfoil is configured to be employed in generating mechanical power that can be converted into other power sources like compressed air or electrical power. Alternatively, the airfoils according to the present subject matter can be used in driving and/or driven propeller blades of propulsion applications. The present airfoils can be advantageously used in blade profiles of rotors that are used as a propeller for air and water/sea travel.

The present subject matter relates to a rotor blade assembly for generating a lift in a fluid installation, the rotor blade assembly comprising an arcuate rotor blade configured to be rotated about its axis; and at least one motion transmitting member connecting the arcuate rotor blade with at least one power generating member for transmitting torque from the arcuate rotor blade to the at least one power generating member.

In an embodiment, the rotor blade comprises a concave surface that is the working surface of the rotor blade and a convex surface with which the at least one motion transmitting member is connected.

In another embodiment, the rotor blade comprises a substantially arcuate configuration extending from a stem section to a tip section.

In yet another embodiment, the rotor blade comprises a central rib that separates the working surface of the rotor blade into a first side or Left-Hand Side and a second side or Right-Hand Side.

In yet another embodiment, the at least one motion transmitting member comprises at least one rotatable main shaft connecting the convex surface of the rotor blade with the at least one power generating member, and one or more supplementary shafts connecting the convex surface of the rotor blade with the at least one rotatable main shaft.

In yet another embodiment, the at least one motion transmitting member is attached at the point of intersection of a first section and a second section of the rotor blade.

In yet another embodiment, the first section comprises about 34% of the arcuate length of the rotor blade extending from the stem section and the second section comprises about 66% of the arcuate length of the rotor blade extending from the tip section.

In yet another embodiment, the rotor blade assembly further comprises a plurality of veins throughout the concave surface and the convex surface of the rotor blade.

In yet another embodiment, the widest section W of the rotor blade is provided at about 34% distance from the stem section of the rotor blade.

In yet another embodiment, the rotor blade comprises a plurality of leading edges and a plurality of trailing edges such that the first leading edge and the first trailing edge are formed in the second section of the rotor blade, and the second leading edge and the second trailing edge are formed in the first section of the rotor blade.

In yet another embodiment, a camber angle of the right-hand side of the rotor blade is greater that a camber angle of the left-hand side of the rotor blade.

A fluid turbine assembly is also provided that comprises the rotor blade assembly aligned axially with a Darrieus Turbine, wherein the rotor blade assembly forms the inner rotor, and the Darrieus Turbine forms the outer rotor.

Further, a multi-rotor fluid turbine assembly is provided that comprises a plurality of rotor blade assemblies mounted on a support plate, said support plate being connected with the at least one power generating member for transmitting torque to the at least one power generating member.

The present subject matter also provides a multi-turbine power generation system comprising a plurality of fluid turbines, each fluid turbine comprising the rotor blade assembly.

Furthermore, the present subject matter provides a method of generating a lift in a fluid installation, the method comprising the steps of causing the fluid to flow over a first leading edge L1 of a rotor blade towards a central rib of the rotor blade; causing the fluid to flow along the central rib of the rotor blade towards a stem section of the rotor blade; and causing the fluid to exit through the stem section of the rotor blade, thereby causing rotation of the rotor blade.

Numerous additional features, embodiments, and benefits of the methods and apparatus of the present invention are discussed below in the detailed description which follows.

BRIEF DESCRIPTION OF ACCOMPANYING DRAWINGS

The present invention, both as to its organization and manner of operation, together with further objects and advantages, may best be understood by reference to the following description, taken in connection with the accompanying drawings. These and other details of the present invention will be described in connection with the accompanying drawings, which are furnished only by way of illustration and not in limitation of the invention, and in which drawings.

DETAILED DESCRIPTION

Figure 1:
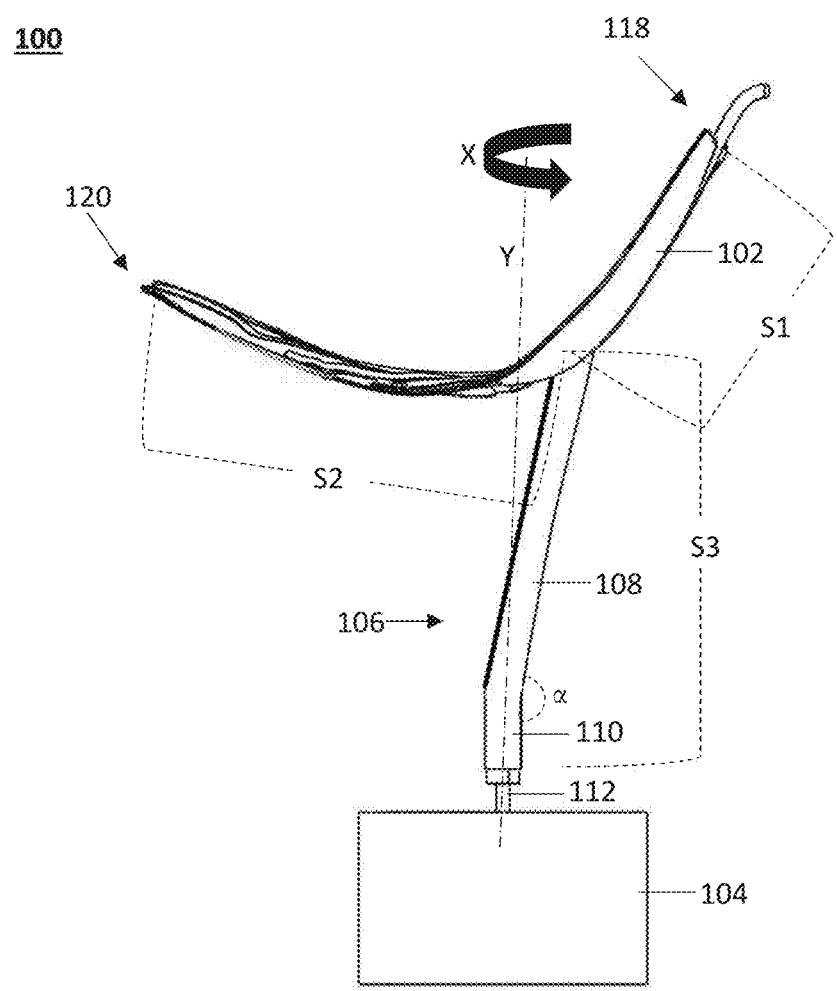
FIG. 1 illustrates a side view of a rotor blade assembly according to a first embodiment of the present subject matter.

The following presents a detailed description of various embodiments of the present subject matter with reference to the accompanying drawings.

The embodiments of the present subject matter are described in detail with reference to the accompanying drawings. However, the present subject matter is not limited to these embodiments which are only provided to explain more clearly the present subject matter to a person skilled in the art of the present disclosure. In the accompanying drawings, like reference numerals are used to indicate like components.

The specification may refer to "an", "one", "different" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "attached" or "connected" or "coupled" or "mounted" to another element, it can be directly attached or connected or coupled to the other element or intervening elements may be present. As used herein, the term "and/or" includes any and all combinations and arrangements of one or more of the associated listed items.

The figures depict a simplified structure only showing some elements and functional entities, all being logical units whose implementation may differ from what is shown.

Rotors determine efficiency and performance of a rotating system. The present invention provides a solution to improve the rotational efficiency, aerodynamic efficiency, and overall efficiency of rotating systems. The present invention also provides a method for generating a lift in applications including but not restricted to vertical and/or horizontal axis wind and/or other fluid turbines, such as hydro turbines, and propellers employed for air and water travel, such as airplanes, ships, boats etc. Typically, for an un-ducted turbine, the efficiency is bound by Betz limit. The rotating airfoils according to the present subject matter are configured to sustain lift in an efficient manner. Further, the proposed airfoils provide autorotation and rapid fluid displacement and retardation. The addition of surface roughness in the form of veins creates a boundary layer for the blade and affect the aerodynamic efficiency of the rotor by creating a subtle layer of disturbed fluid on the surface so that the moving fluid does not directly interact with the blade surface which would otherwise increase drag. In other words, a local drag is created due to the presence of surface roughness.

The airfoils according to the present invention can be applied in vertical and/or horizontal axis wind and/or other fluid turbines, such as hydro turbines. In an embodiment, the proposed airfoils are configured to be used for generating mechanical power that can be converted into other power sources like compressed air or electrical power. However, the scope of the present invention is not limited to wind and/or fluid turbine applications. Alternatively, the rotor with blade profile employing the present airfoil can be employed as a propeller for air and underwater/sub-sea travel. Similarly, the present airfoil can also be applied to other applications where desired lift is required. In a preferred embodiment, any number of blades comprising the present airfoil can be employed in a system. In yet another preferred embodiment, a rotor blade comprising the present airfoil can be angled in any direction with respect to the flow in a 3-dimensional space.

The airfoil in accordance with a preferred embodiment of the present invention comprises a monofoil that readily autorotates and provides a continuous as well as asymmetric blade profile.

FIG. 1 illustrates a side view of a rotor blade assembly 100 in accordance with a first embodiment of the present subject matter. The rotor blade assembly 100 according to a preferred embodiment is configured to be employed in a multitude of applications including but not limited to turbines employed in wind turbine installations, hydro turbine installations etc. as well as propellers employed in air travel, water travel and so on. In an embodiment, the rotor blade assembly 100 comprises a plurality of components. Major components of the rotor blade assembly 100 include but are not limited to at least one rotatable rotor blade 102, at least one power generating member or generator 104 for generating power, at least one motion transmitting member for transmitting rotary motion from the rotor blade 102 to the generator 104. In a preferred embodiment, the rotor blade assembly 100 is configured to be operated by the fluid comprising but not limited to water and wind surrounding the rotor blade assembly 100. For example, the rotor blade assembly 100 according to the present subject matter can be employed in a hydro turbine installation that is installed under water or can be employed in a wind turbine installation located above the ground level. However, in other embodiments, the rotor blade assembly 100 can be employed in other installations comprising but not limiting to gas turbines and steam turbines. In yet another preferred embodiment, the generator 104 employed in the present rotor blade assembly 100 comprises a permanent magnetic synchronous generator (PMSG).

In a preferred embodiment, the motion transmitting member comprises at least one main shaft 106 for transmitting rotary motion or torque from the rotor blade 102 to the generator 104 and at the same time for supporting the rotor blade 102 in the rotor blade assembly 100, as shown in FIG. 1. Therefore, the main shaft 106 apart from transmitting motion also acts as a load bearing shaft that is connected to the rotor blade 102 at a point bordering a first section S1 and a second section S2 of the rotor blade 102. The length of the main shaft 106 from the generator 104 to the point bordering the first section S1 and the second section S2 is defined as a third section S3.

The embodiment explained in FIG. 1 depicts only one main shaft 106 that comprises a tilted segment 108 and a vertical segment 110. The tilted segment 108 is angled from the vertical segment 110 by an angle α such that the tilted segment 108 connects the point bordering the first section S1 and the second section S2 of the rotor blade 102, as shown in FIG. 1. In a preferred embodiment, the angle α is an obtuse angle ranging between 150° to 179°, preferably about 167°. However, in other embodiments, the angle α may define an angle other than that ranging between 150° to 179°. In yet another embodiment, the main shaft 106 may include more than two segments angled in a suitable manner such that one end of the main shaft 106 is attached to the point bordering the first section S1 and the second section S2 of the rotor blade 102 and the other end is connected to the generator 104 for effectively transferring rotational motion or torque from the rotor blade 102 to the generator 104. In another embodiment, more than one main shaft 106 may be employed without deviating from the scope of the present subject matter. According to a preferred embodiment, the main shaft 106 is connected to the generator 104 by means of a connecting rod 112, as shown in FIG. 1. In an embodiment, the rotor blade 102 is configured to rotate in anticlockwise direction as shown by arrow X about its axis Y, thereby enabling rotation of the main shaft 106.

Figure 2:
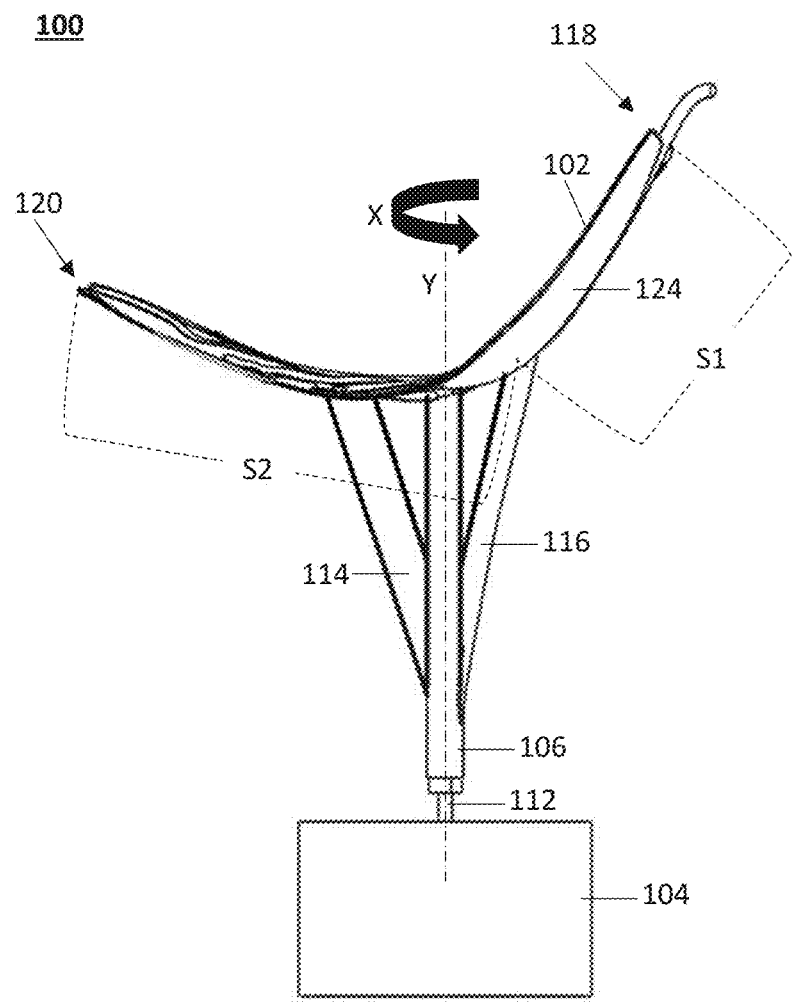
FIG. 2 illustrates a side view of a rotor blade assembly in accordance with a second embodiment of the present subject matter.

In an embodiment, the main shaft 106 may comprise a single straight segment without any angular segment, as shown in FIG. 2, which depicts a side view of a rotor blade assembly 100 in accordance with a second embodiment of the present subject matter. As shown in FIG. 2, the main shaft 106 is configured vertically and is connected to the generator 104 by means of the connecting rod 112. In the present embodiment, the motion transmitting member comprises one or more supplementary shafts 114, 116 apart from the main shaft 106. The supplementary shafts 114, 116 are configured to assist the main shaft 106 in transferring rotational motion or torque from the rotor blade 102 to the generator 104 and also in supporting the rotor blade 102 in the rotor blade assembly 100. According to the present invention, the supplementary shafts 114, 116 connect the rotor blade 102 with the main shaft 106 while only the main shaft 106 is connected to the generator 104. In a preferred embodiment, as shown in FIG. 2, the rotor blade assembly 100 comprises two supplementary shafts 114, 116 connecting the rotor blade 102 with the main shaft 106. In another embodiment, the rotor blade assembly 100 comprises three or four supplementary shafts connecting the rotor blade 102 with the main shaft 106. However, the number of supplementary shafts is not limited to those described above and may vary without deviating from the scope of the present subject matter. Further, the main shaft 106 and/or the supplementary shafts 114, 116 may comprise an arcuate configuration along their respective lengths. In the present embodiment, the main shaft 106 is connected at about central location of the rotor blade 102 while one of the supplementary shafts 116 is attached at the point of intersection of the first section S1 and the second section S2, as shown in FIG. 2.

In the embodiments explained above, the rotor blade 102 is configured to rotate about its axis Y in anticlockwise direction X. However, it is made clear that the rotor blade 102 may rotate in clockwise direction without deviating from the scope of the present subject matter. Therefore, the rotor blade 102 and hence the main shaft 106 are configured to rotate either in clockwise direction or in anti-clockwise direction. The direction of rotation of the rotor blade 102 depends upon the direction of flow of fluid. In yet another embodiment, the rotor blade 102 is configured to rotate both in clockwise direction and in anticlockwise direction depending upon the motion of the stream in a fluid installation system without deviating from the scope of the present subject matter. In such embodiment, both the motion of the fluid stream and the orientation of the rotor blade or airfoil would have to be changed to alter the direction of rotation. Once the parameters are fixed, the turbine would rotate in the same direction and the generator poles would not need to be changed for a change in flow direction of the fluid. In any of the given configurations, no yawing mechanism is required for the operation in the real environment.

In the embodiments depicted FIGS. 1 and 2, the main shaft 106 and the supplementary shafts 114, 116 comprise cylindrical cross section. However, in other embodiments, the cross section of the main shaft 106 and the supplementary shafts 114, 116 may include other configurations comprising but not limited to polygonal and conical cross sections to aid in the structural strength and aerodynamical performance of the shafts. In yet another embodiment, the main shaft 106 and the supplementary shafts 114, 116 may include multiple cross sections across their respective lengths. Similarly, the cylindrical main shaft 106 and the supplementary shafts shown in FIGS. 1 and 2 comprise a uniform diameter across their respective lengths. However, in other embodiments, the cross section of the main shaft 106 and the supplementary shafts may vary across their respective lengths as depicted for example in FIG. 3, which illustrates a perspective view of the rotor blade assembly 100 in accordance with a third embodiment of the present subject matter. As shown herein, the main shaft 106 comprises a straight segmented shaft having varying diameters across its length. Further, the rotor blade assembly 100 according to the present embodiment comprises only one supplementary shaft having uniform diameter across its length.

Figure 3:
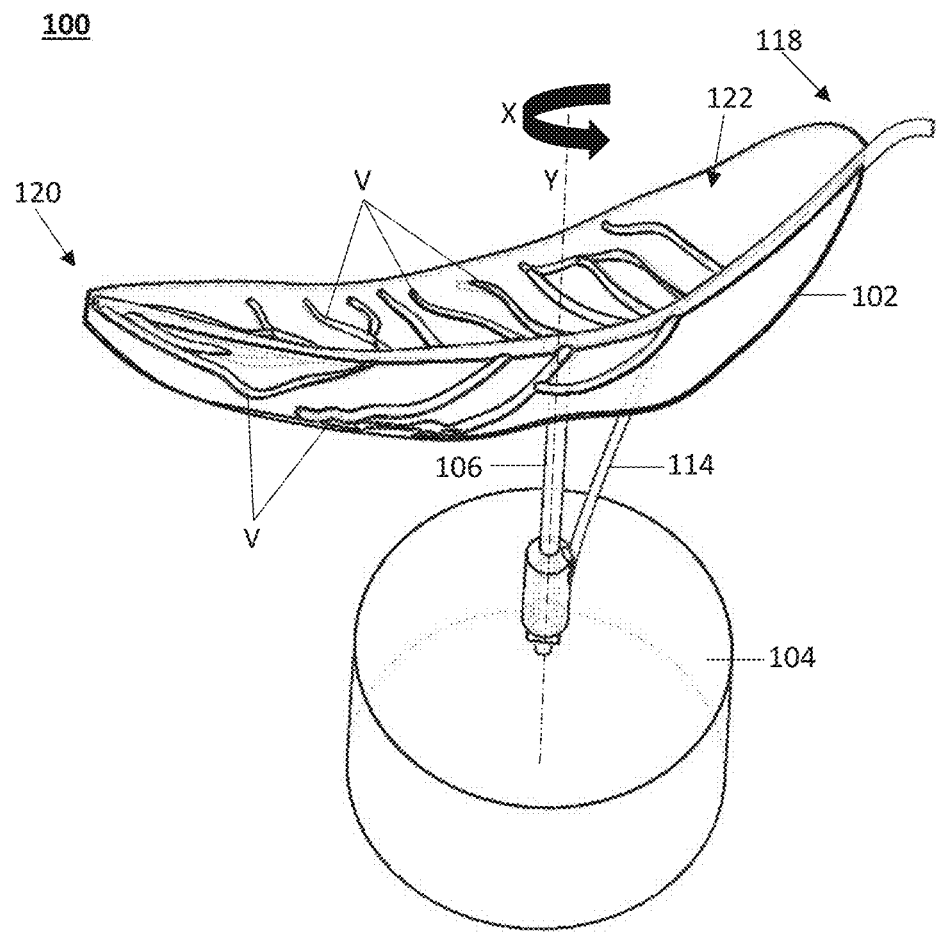
FIG. 3 illustrates a perspective view of a rotor blade assembly in accordance with a third embodiment of the present subject matter.

The rotor blade assembly 100 according to a preferred embodiment is configured to be employed in a multitude of applications including but not limited to turbines of wind and hydro turbine installations as well as propellers for applications in air and water travel. In a preferred embodiment, as shown in FIGS. 1 to 3, the rotor blade 102 comprises a substantially arcuate configuration extending from a stem section 118 to a tip section 120. In a preferred embodiment, the concave surface 122 of the substantially arcuate rotor blade 102 comprises the working surface, i.e., the surface on which fluid exerts force for facilitating rotation of the rotor blade 102. In a preferred embodiment, the tip section 120 comprises the narrowest point of the rotor blade 102.

Figure 4:
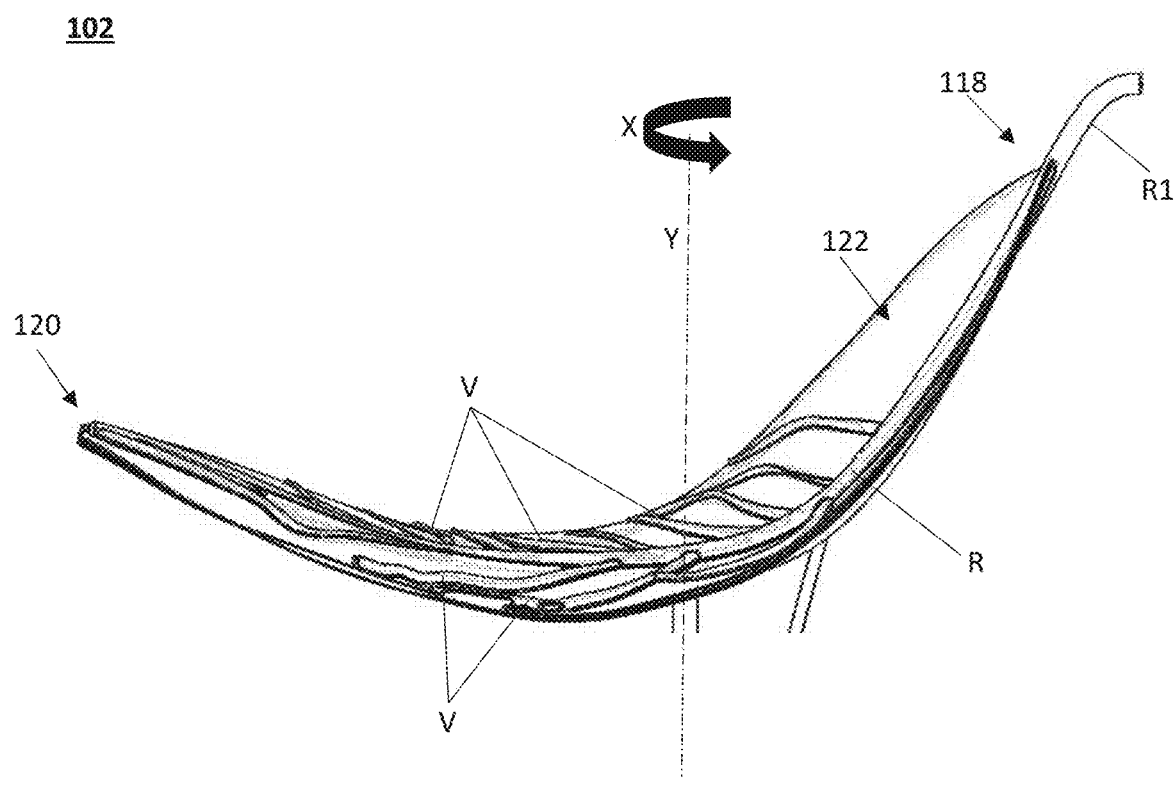
FIG. 4 illustrates a side perspective view of a rotor blade of the rotor blade assembly in accordance with an embodiment of the present subject matter.
Figure 5:
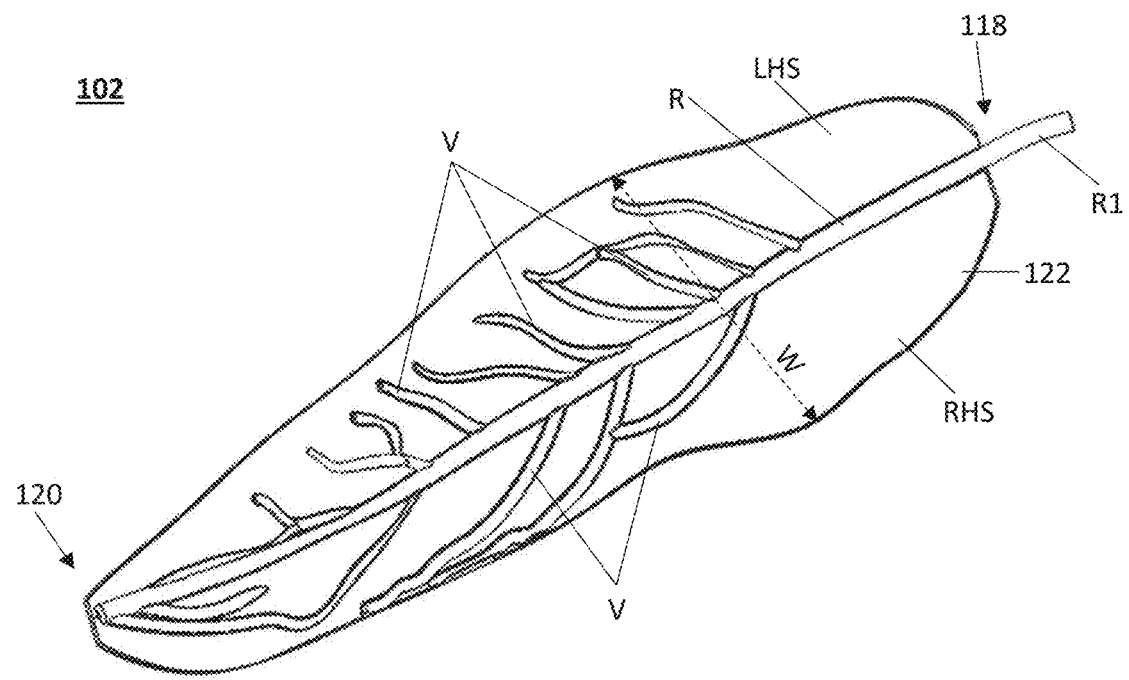
FIG. 5 illustrates a top view of the rotor blade of rotor blade assembly in accordance with an embodiment of the present subject matter.
Figure 6:
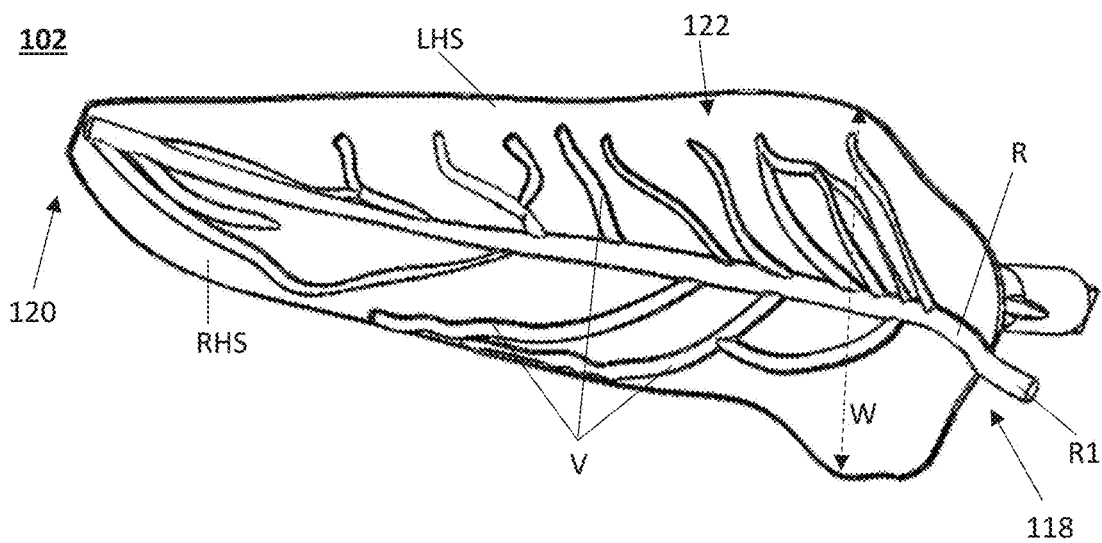
FIG. 6 illustrates a top perspective top view of the rotor blade of rotor blade assembly in accordance with an embodiment of the present subject matter.

The configuration of the rotor blade 102, in a preferred embodiment, is shown in FIGS. 4, 5 and 6, which illustrate a side perspective view, a top view and a top perspective view of the rotor blade 102 respectively. As shown herein, the rotor blade 102 comprises the stem section 118, the tip section 120, and the concave surface 122 that forms the working surface 122 of the rotor blade 102. In a preferred embodiment, the rotor blade 102 comprises a longitudinal central rib R that separates the working surface 122 of the rotor blade 102 into a first side or Left-Hand Side LHS and a second side or Right-Hand Side RHS, as shown in FIGS. 5 and 6.

Figure 7:
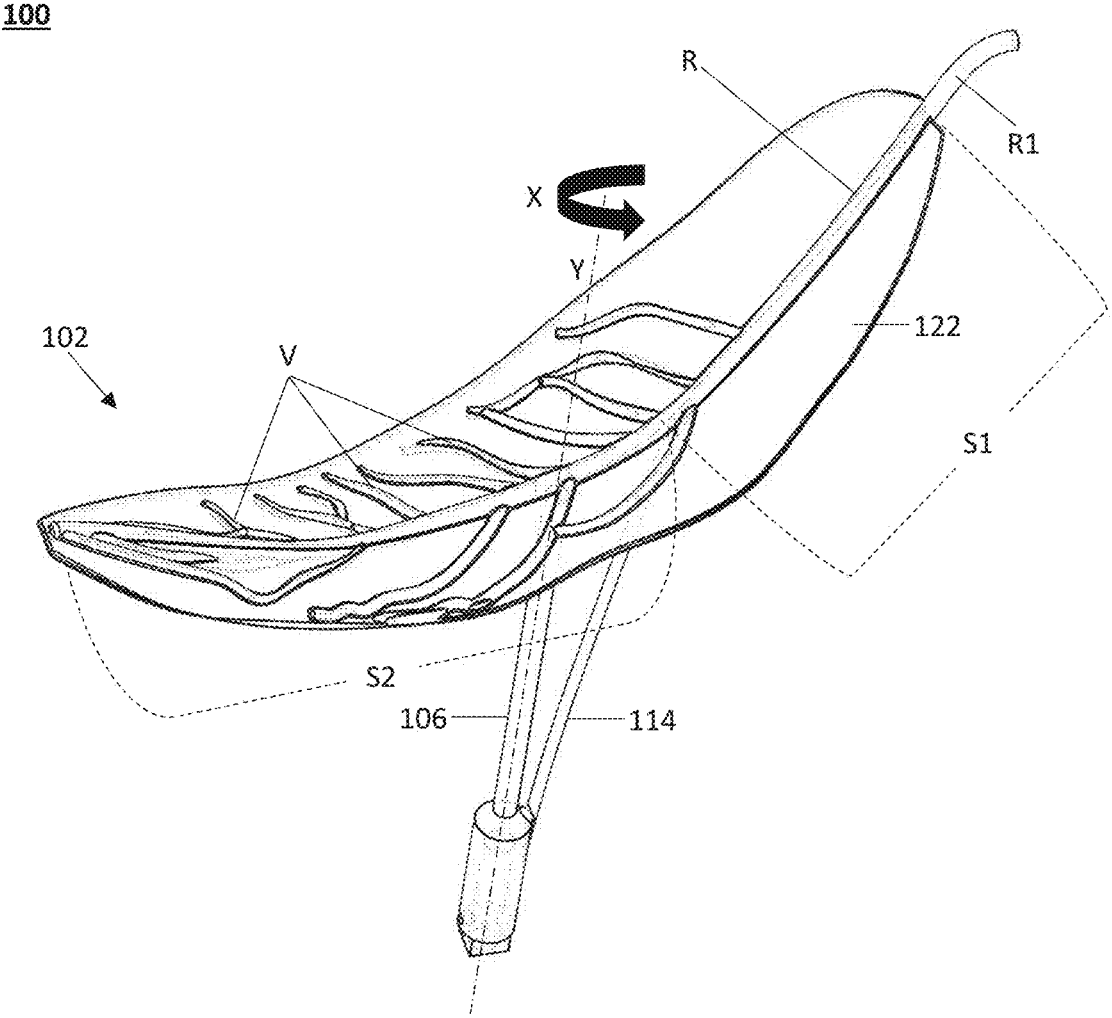
FIG. 7 illustrates a top perspective view of a rotor blade depicting a web of veins at its concave surface in one embodiment of the present subject matter.

FIG. 7 illustrates a perspective view of the rotor blade assembly 100 in accordance with one embodiment of the present subject matter. As shown herein, the rotor blade assembly 100 comprises a plurality of sections including but not limited to the first section S1 or section 1, the second section S2 or section 2 and the third section S3 or section 3. In a preferred embodiment, the first section S1 comprises about 34% of the arcuate length of the rotor blade 102 extending from a top end, i.e., the stem section 118 of the rotor blade 102 and the second section S2 comprises about 66% of the arcuate length of the rotor blade 102 extending from the tip section 120 of the rotor blade 102. The widest section W of the rotor blade 102, in an embodiment, is provided at about 34% distance from the stem section 118 of the rotor blade 102.

Figure 7A:
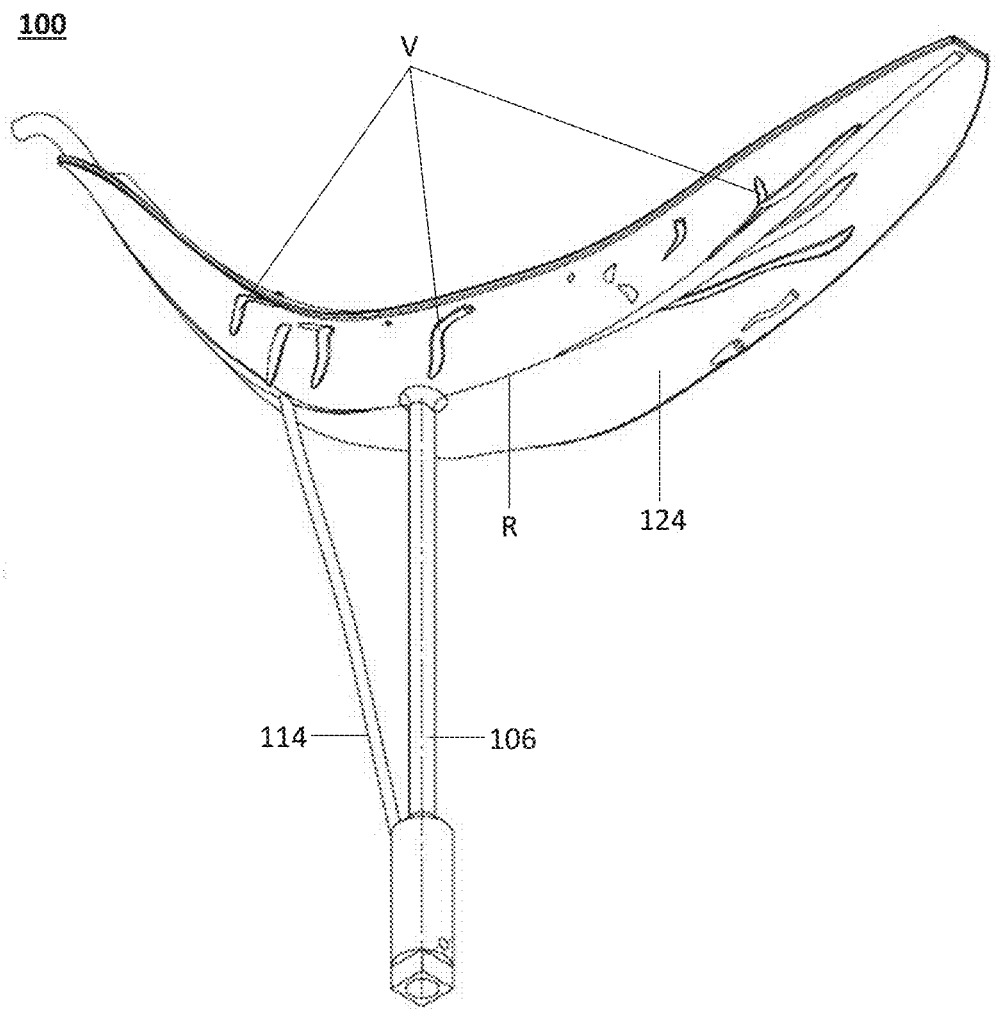
FIG. 7A illustrates a bottom perspective view of a rotor blade depicting a web of veins at its convex surface in one embodiment of the present subject matter.

According to the preferred embodiments described above, the rotational motion or torque from the rotor blade 102 is transferred to the generator 104 with the help of the rotatable main shaft 106 and optionally one or more supplementary shafts 114, 116, as shown in FIGS. 1, 2 and 7. In a preferred embodiment, the main shaft 106 is also the load bearing shaft and forms the third section S3 of the rotor blade assembly 100. The main shaft 106 connects the central rib R of the rotor blade 102 with the generator 104 for transfer of rotational motion or torque from the rotor blade 102 to the generator 104, as shown in FIG. 7A, which illustrates a bottom schematic representation of the rotor blade assembly 100 in accordance with one embodiment of the present subject matter. In an embodiment, the axis of rotation Y of the rotor blade 102 is slightly off-center from the main shaft 106, as shown in FIG. 1. In another embodiment, the axis of rotation Y of the rotor blade 102 coincides with the axis of the main shaft 106, as shown in FIG. 2.

In a preferred embodiment, one end of the main shaft 106 is attached to the central rib R. The positioning of the main shaft 106 is such that when the force is exerted by the surrounding fluid on the concave surface 122, i.e., the working surface, of the rotor blade 102, the rotor blade 102 rotates about the axis of rotation Y. This enables rotation of the main shaft 106 about its axis Y to transmit the rotational motion or torque to the generator 104 for generating the desired output. The continuous exertion of force by surrounding fluid on the working surface 122 of the rotor blade 102 ensures continuous rotation of the rotor blade 102, thereby ensuring continuous output generation by the generator 104. In an embodiment, the main shaft 106 may be attached at the center of the arcuate length of the central rib R.

During rotation, the central rib R dips along with the second section S2 of the rotor blade 102 and diverges to the remainder of the rotor blade 102 on one side and the load bearing main shaft 106 on the other. The remainder of the airfoil, i.e., the first section S1 twists inwards, i.e., towards Right-Hand Side (RHS) of the rotor blade 102. This is also the direction of rotation of the rotor blade 102.

According to a preferred embodiment of the present subject matter, the rotor blade 102 comprises a single continuous structure that is formed around the central rib R, as shown in FIGS. 4 to 7. In a preferred embodiment, the central rib R extends from the stem section 118 to the tip section 120 through the arcuate length of the rotor blade 102, as can be seen in FIGS. 5 to 7. In an embodiment, the central rib R comprises an extended portion R1 that extends from the stem section 118. As also shown in FIG. 4, the tip section 120 comprises the narrowest section of the rotor blade 102 and is curved inwards in a preferred embodiment. In another preferred embodiment, the first section S1 of the rotor blade 102 is provided with a backward bend, as shown in FIG. 4.

In a preferred embodiment, the rotor blade 102 comprises a plurality of veins V throughout the concave surface 122 of the rotor blade 102. The plurality of veins V provide roughness on the concave surface 122 of the rotor blade 102 that aids in creating a boundary layer near the surface, thereby improving efficiency of the rotor blade. Moreover, veins V add to the structural strength of the rotor blade 102. In an embodiment, a dense web of veins V spread throughout the concave surface 122 of the rotor blade 102. In another embodiment, the veins V are provided both on the concave surface 122 as well as on the convex surface 124 of the rotor blade 102, as shown in FIG. 7A. As shown in FIG. 7A, the main shaft 106 and the supplementary shafts 114, 116 are attached at the convex surface 124 of the rotor blade 102.

In a preferred embodiment, the dimensions of the rotor blade assembly 100 according to the present subject matter are as follows:
Total arcuate length of the rotor blade 102 from stem section 118 to tip section 120=about 255 mm
Total arcuate length of the extended portion R1=about 26 mm
Total arcuate length of first section S1=about 86 mm
Total arcuate length of second section S2=about 169 mm
Total arcuate length of third section S3=about 131 mm
Ratio S1:S2=about 0.50
Ratio S1:S3=about 0.65
Ratio S1+S3:S1+S2=about 0.85

Figure 8:
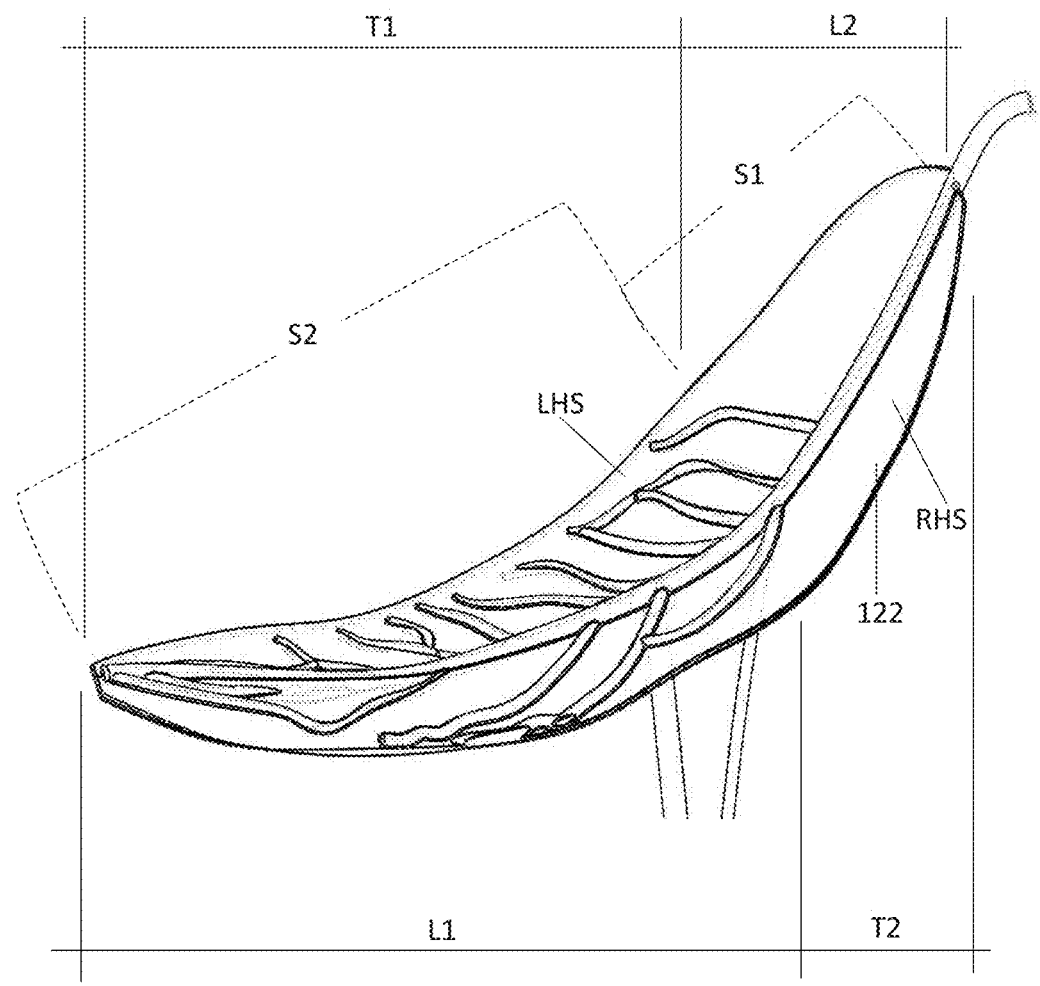
FIG. 8 illustrates a perspective view of a rotor blade of the rotor blade assembly depicting its leading edges and trailing edges in accordance with an embodiment of the present subject matter.

FIG. 8 illustrates a perspective view of the rotor blade 102 depicting its leading edges L1, L2 and trailing edges T1, T2 in accordance with an embodiment of the present subject matter. In a preferred embodiment, the first leading edge L1 and the first trailing edge T1 are formed in the second section S2, and the second leading edge L2 and the second trailing edge T2 are formed in the first section S1. In a preferred embodiment, the first leading edge L1 and the second trailing edge T2 are provided at the right-hand side RHS of the rotor blade 102. Similarly, the second leading edge L2 and the first trailing edge T1 are provided on the left-hand side LHS of the rotor blade 102.

Figure 9:
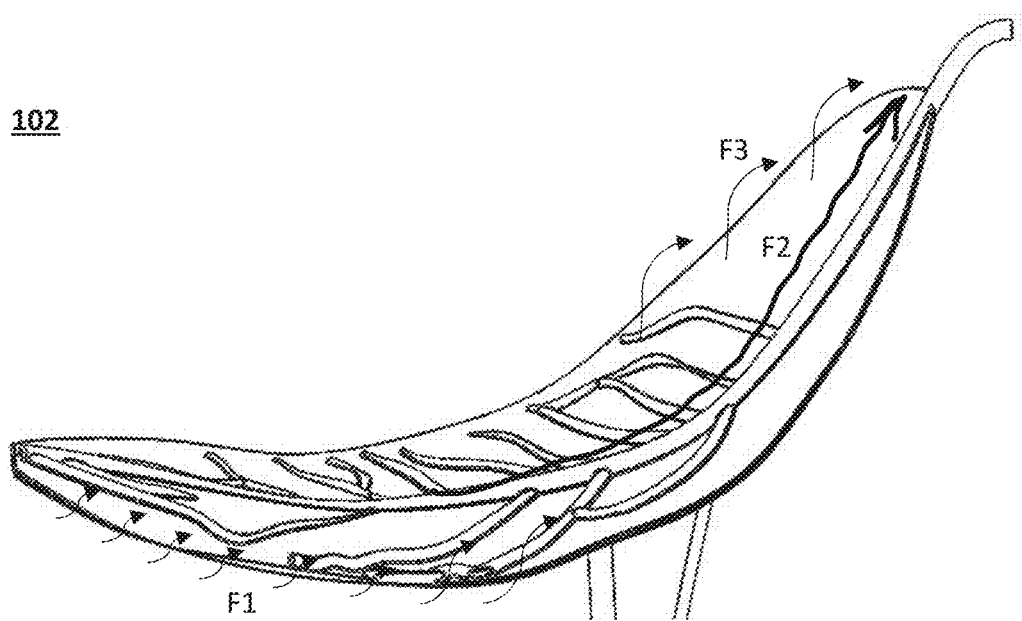
FIG. 9 illustrates a perspective view of a rotor blade of the rotor blade assembly depicting flow of fluid over the rotor blade in accordance with an embodiment of the present subject matter.

The flow of fluid over the working surface 122 of the rotor blade 102 is depicted by arrows F1, F2 and F3 in FIG. 9, which also illustrates a perspective view of the rotor blade 102 in accordance with an embodiment of the present subject matter.

Figure 10:
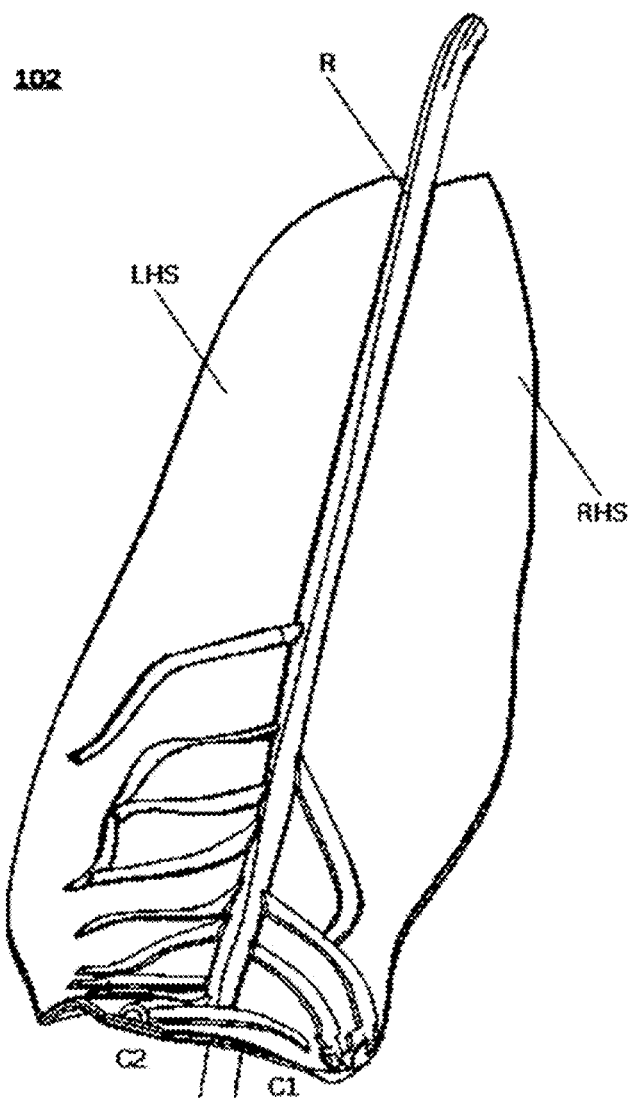
FIG. 10 illustrates a front view of a rotor blade of the rotor blade assembly depicting convergence of left-hand side and right-hand side about a longitudinal central rib in accordance with an embodiment of the present subject matter.

FIG. 10 illustrates a front view of a rotor blade 102 depicting camber angle comparison between the left-hand side LHS and the right-hand side RHS in accordance with one embodiment of the present subject matter. As shown herein, the camber angle C1 of the right-hand side RHS of the rotor blade 102 is greater that the camber angle C2 of the left-hand side LHS of the rotor blade 102, in a preferred embodiment. In another preferred embodiment, the camber angles C1 and C2 are almost zero from the portion extending from the tip section 120 to the point bordering a first section S1 and a second section S2 of the rotor blade 102. In other words, the camber at the tip section 120 of the rotor blade 102 is the same. Camber increases on the RHS gradually from tip section 120 to end of the first section S1. The LHS section remains relatively flat from the tip section 120 to end of the first section S1. RHS has a greater camber than LHS from the tip section 120 to the end of the first section S1. This is the same portion as the leading edge L1 which allows the flow of fluid over the surface of the blade.

As can be seen in FIG. 6, in an embodiment, the left-hand side LHS of the rotor blade 102 is angled near the stem section 102 for inducing rotation to the rotor blade 102 in an anti-clockwise direction. Further, in an embodiment, the right-hand side RHS of the rotor blade has a backward bend as shown in FIG. 6.

The first leading edge L1 causes the fluid to flow towards the central rib R from the first leading edge L1, as shown by arrows F1 in FIG. 9. From here, the fluid flow moves along the central rib R and towards the stem section 118 as shown by arrow F2 in FIG. 9. Some of the fluid flow escapes through the second leading edge L2 in the first section S1 of the left-hand side LHS, as shown by arrows F3, but the remainder fluid flow stays on course to leave the airfoil through the stem section 102, shown by arrow F2 in FIG. 9.

Figure 11:
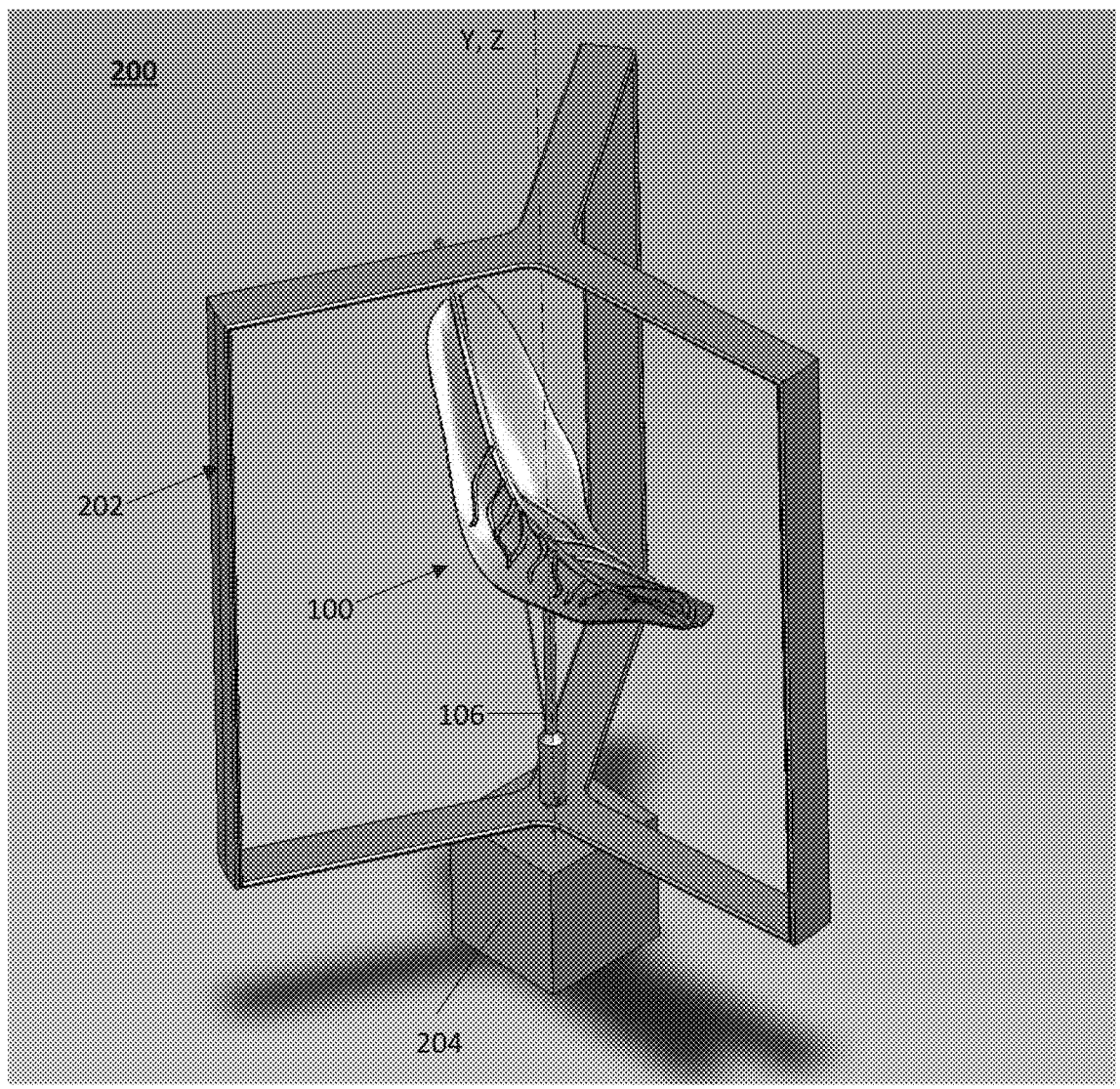
FIG. 11 illustrates a perspective view of a rotor blade assembly in combination with Darrieus Turbine in accordance with an embodiment of the present subject matter.
Figure 12:
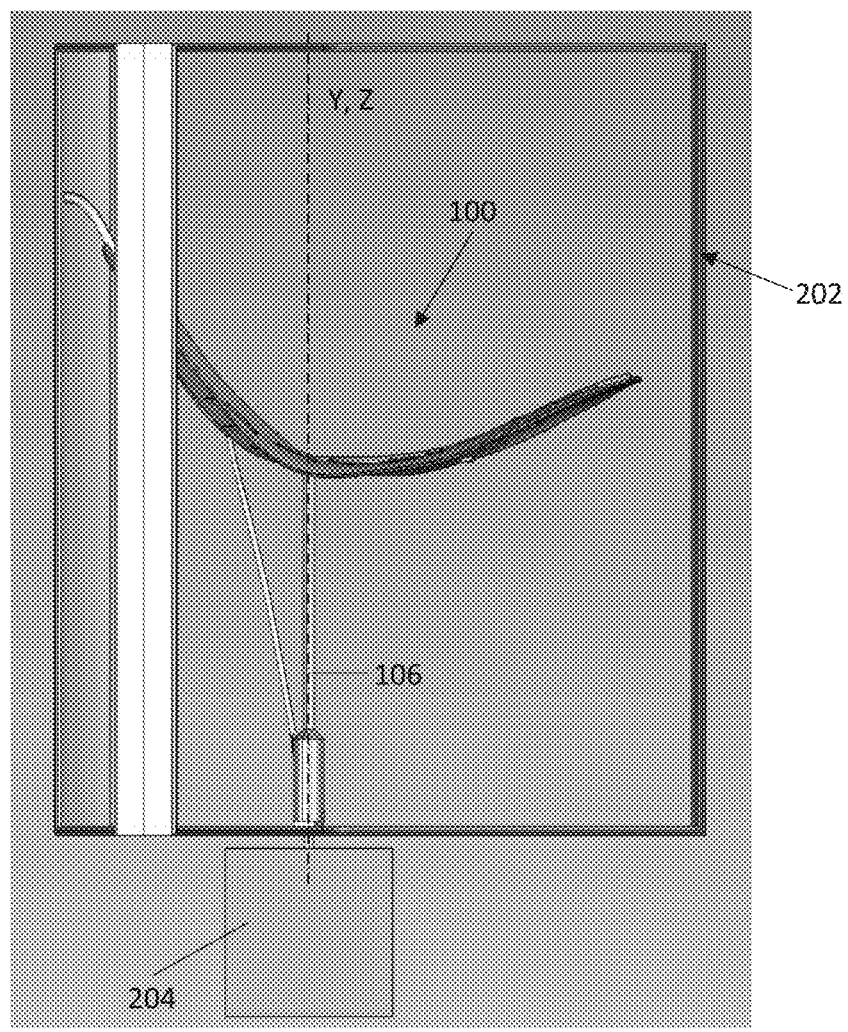
FIG. 12 illustrates a side view of a rotor blade assembly in combination with Darrieus Turbine in accordance with an embodiment of the present subject matter.

FIGS. 11 and 12 illustrate a perspective view and a side view respectively of a fluid turbine assembly 200 comprising the rotor blade assembly 100 in combination with Darrieus Turbine 202 in accordance with an embodiment of the present subject matter. As shown herein, the rotor blade assembly 100 in combination with Darrieus Turbine 202 of the present embodiment are aligned about their axes of rotation. In other words, the axis of rotation Y of the rotor blade assembly 100 coincides with the axis of rotation Z of the Darrieus Turbine 202. According to the present embodiment, the rotor blade assembly 100 forms the inner rotor of the fluid turbine assembly 200 and the Darrieus Turbine 202 forms the outer rotor of the fluid turbine assembly 200. In another embodiment, the Darrieus Turbine 202 can be replaced with other types of outer rotors like a helical blade profile or Gorlov or other combinations of rotor blades. The attachment points may also vary to assist in the load transfer function from the rotor blade to the generator shaft.

Figure 13:
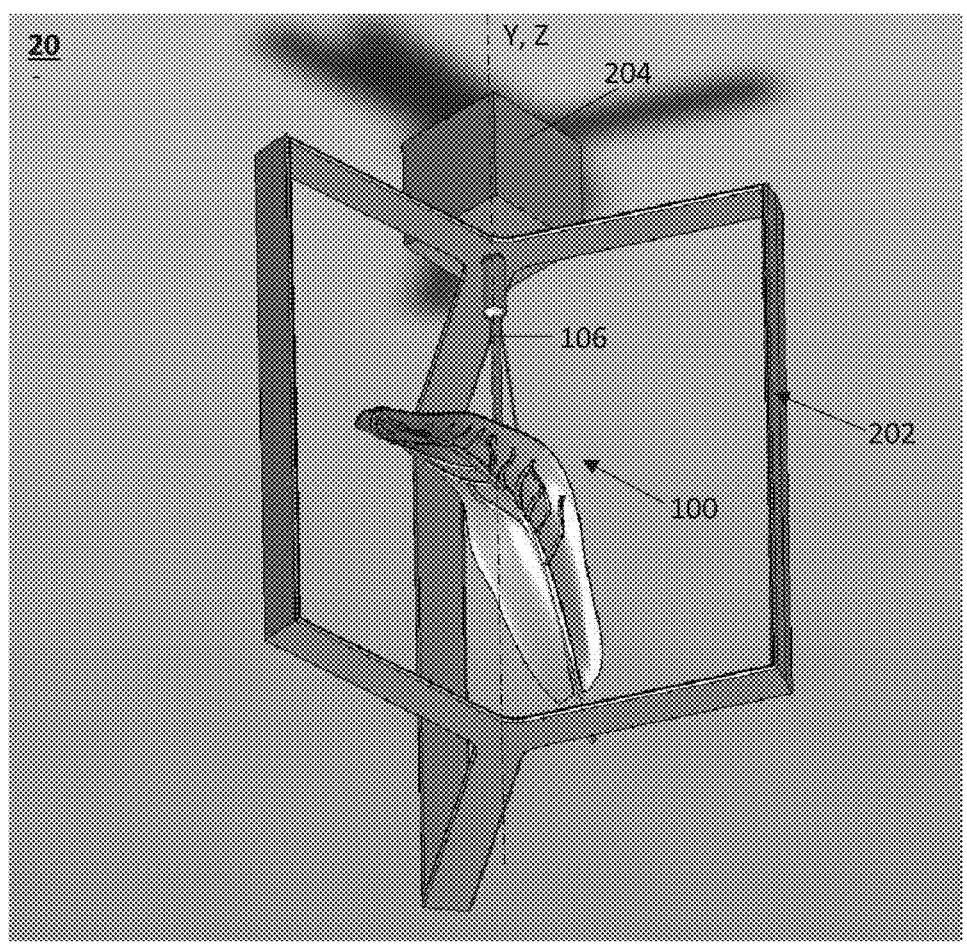
FIG. 13 illustrates a perspective view of a rotor blade assembly in combination with Darrieus Turbine mounted upside down in accordance with an embodiment of the present subject matter.

Both the rotor blade assembly 100 and the Darrieus Turbine 202 of the fluid turbine assembly 200 are configured to together, but independently of each other, transfer torque to the generator encompassed in a water-tight generator casing 204 for power generation. In the embodiment depicted in FIGS. 11 and 12, the generator casing 204 encompassing the generator is placed below the assembly of the rotor blade assembly 100 and the Darrieus Turbine 202. However, in another embodiment, the generator casing 304 encompassing the generator can be placed above the assembly of the rotor blade assembly 100 and the Darrieus Turbine 202, as shown in FIG. 13, which depicts a perspective view of a rotor blade assembly in combination with Darrieus Turbine mounted upside down in accordance with an embodiment of the present subject matter. The fluid turbine assembly 200 of the embodiment depicted in FIGS. 11 to 13 improves the performance of the Darrieus turbine by smoothening the flow around the main shaft 106, thereby increasing the life of the hydro turbine and improves the continuity of the torque profile for the generator. In an embodiment, a support above the curved rotor blade 102 may be added to provide an enhanced efficiency and strength of the fluid turbine assembly 200.

Figure 14:
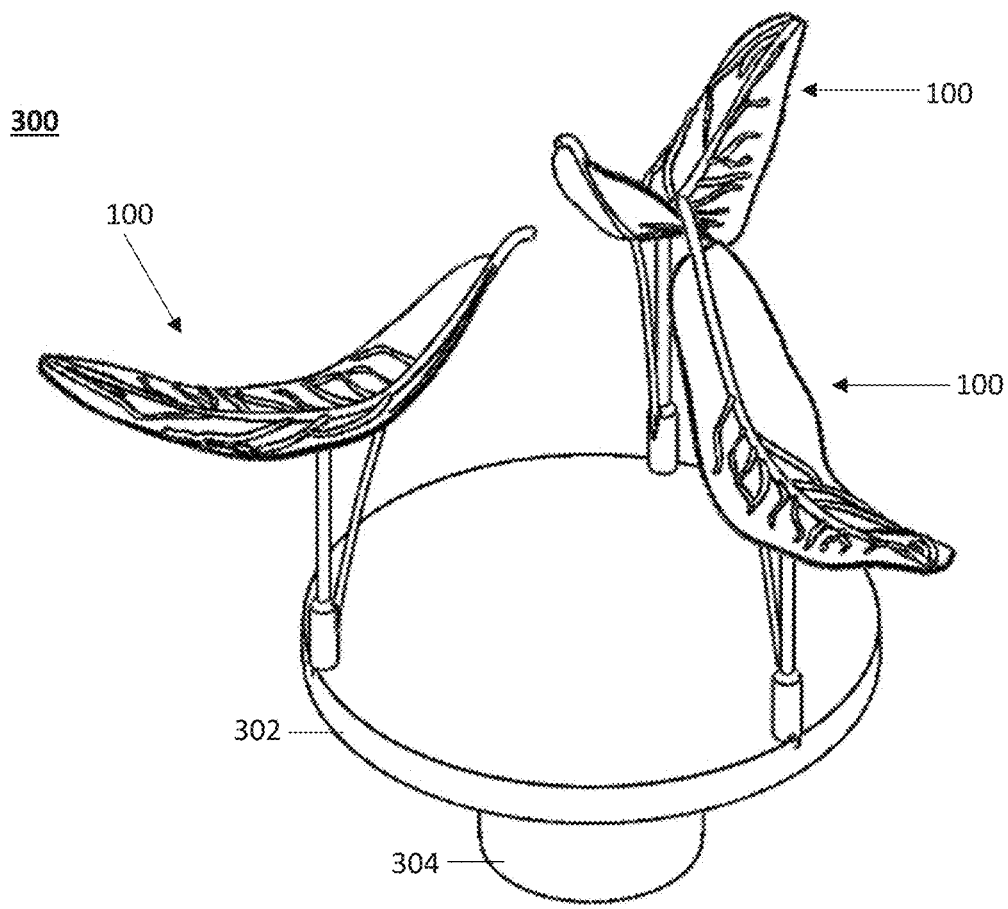
FIG. 14 illustrates a perspective view of a multi-rotor fluid turbine assembly according to an embodiment of the present subject matter.
Figure 15:
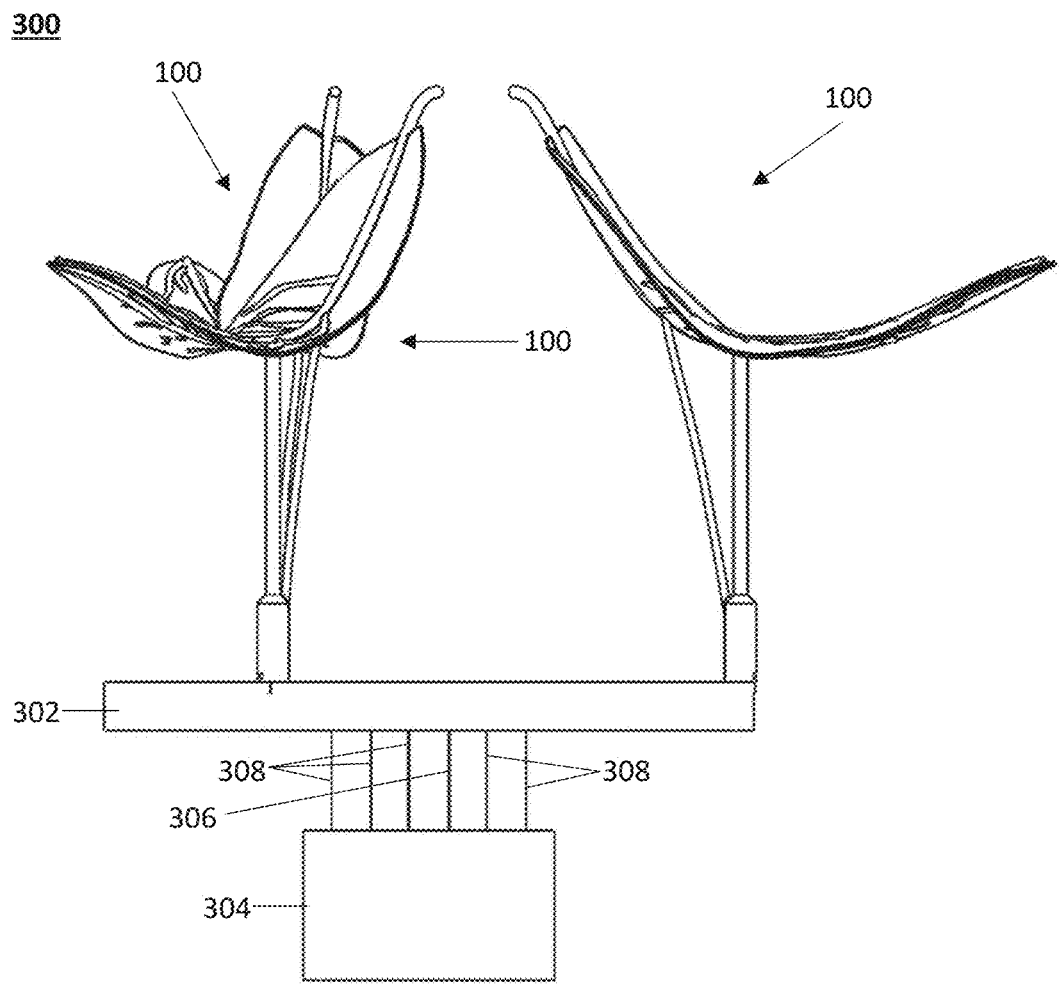
FIG. 15 illustrates a side view of a multi-rotor fluid turbine assembly according to an embodiment of the present subject matter.

FIGS. 14 and 15 illustrate a perspective view and a side view respectively of a multi-rotor fluid turbine assembly 300 according to an embodiment of the present subject matter. The multi-rotor fluid turbine assembly 300 comprises three rotor blade assemblies 100 mounted on a support plate 302. The support plate 302 is in turn connected to the generator encompassed in a water-tight generator casing 304 for power generation. In a preferred embodiment, the support plate 302 is directly connected to the generator shaft 306 at the center and a plurality of support rods 308 are provided for supporting the support plate 302 multi-rotor fluid turbine assembly 300. In another embodiment, the support plate 302 may be connected to the generator shaft 306 through a connecting rod. In the present embodiment, the multi-rotor fluid turbine assembly 300 comprises three rotor blade assemblies 100. However, more than or less than three rotor blade assemblies 100 can be installed on the support plate 302 without departing from the present subject matter. Further, the rotor blade assemblies 100 are mounted at the edge of the support plate 302 for enhanced efficiency of the multi-rotor fluid turbine assembly 300. However, in another embodiment, the rotor blade assemblies 100 may be mounted at any desired location on the support plate 302 without deviating from the present subject matter.

Figure 16:
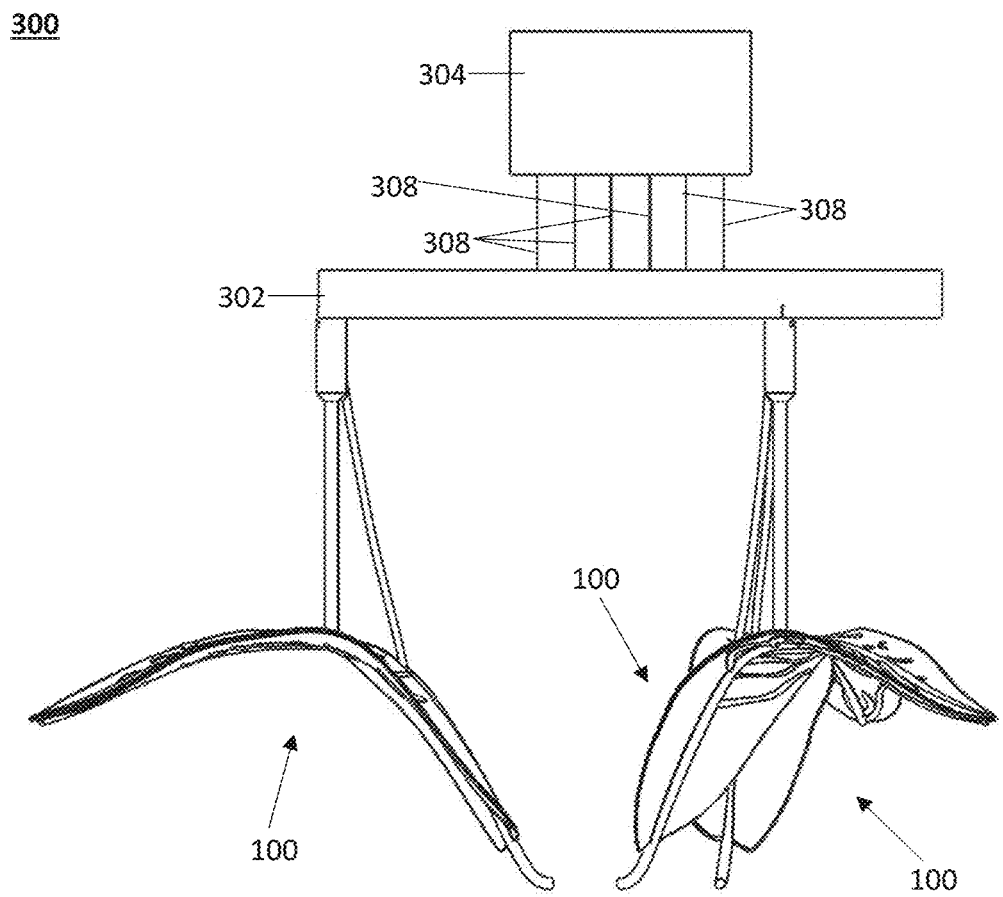
FIG. 16 illustrates a perspective view of a multi-rotor fluid turbine system mounted upside down according to an embodiment of the present subject matter.

In the embodiment depicted in FIGS. 14 and 15, the generator casing 304 encompassing the generator is placed below the support plate 302 with the rotor blade assemblies 100 mounted thereon. However, in another embodiment, the generator casing 304 encompassing the generator may be placed above the support plate 302 and the rotor blade assemblies 100 may be provided below the support plate 302 in another embodiment, as shown in FIG. 16, which depicts a perspective view of a multi-rotor fluid turbine system 300 mounted upside down according to an embodiment of the present subject matter.

Figure 17:
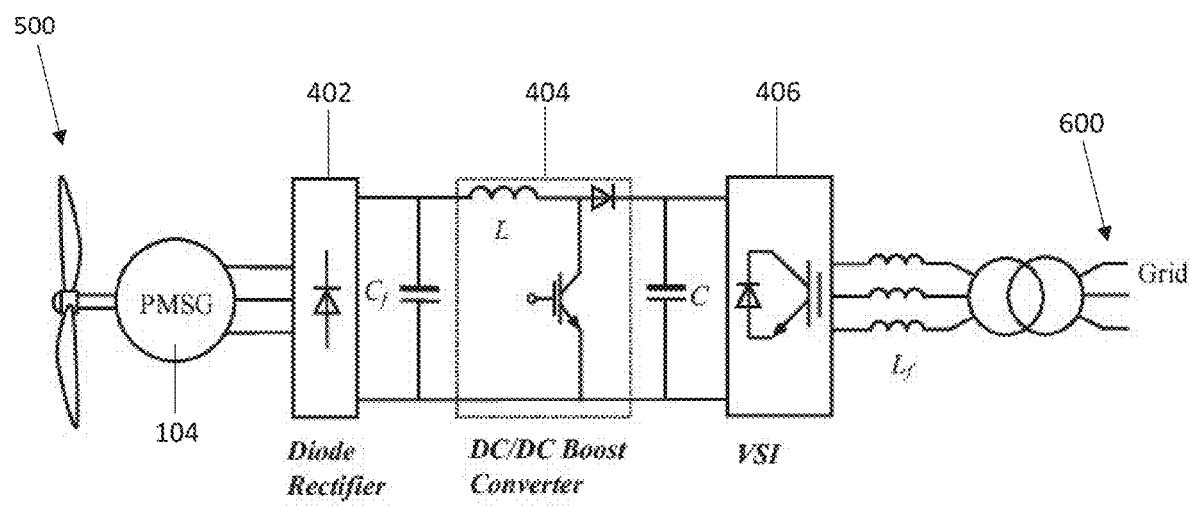
FIG. 17 illustrates a schematic representation of a circuit connection between a fluid turbine assembly and a grid according to an embodiment of the present subject matter.

FIG. 17 illustrates a schematic representation of a circuit connection 400 between a fluid turbine 500 comprising one or more rotor blade assemblies 100 and a grid 600 according to an embodiment of the present subject matter. The generator 104 according to the present embodiment comprises a permanent magnetic synchronous generator (PMSG) generator. However, in other embodiments, other types of generators may be employed for power generation. In an embodiment, the generator comprising but not limited to an AC 3 phase generator may be employed when the RPM of the turbine is constant, or the flow characteristics of the water channel are constant. The circuit connection 400 comprises a plurality of components for transferring the power generated in the fluid turbine 500 to the grid 600. For example, major components of the circuit connection 400 comprises a diode rectifier 402, a DC/DC Boost Converter 404, an inverter VSI 406, a plurality of capacitors and inductors. The PMSG 104 is connected to the diode rectifier 402 via a filter for performing the AC-to-DC conversion step. The voltages is then rectified and charges the capacitors on the DC-bus. The DC voltage is then converted to an AC voltage with the help of the inverter VSI 406. The inverter output is filtered before the system is grid connected via a transformer.

Figure 18:
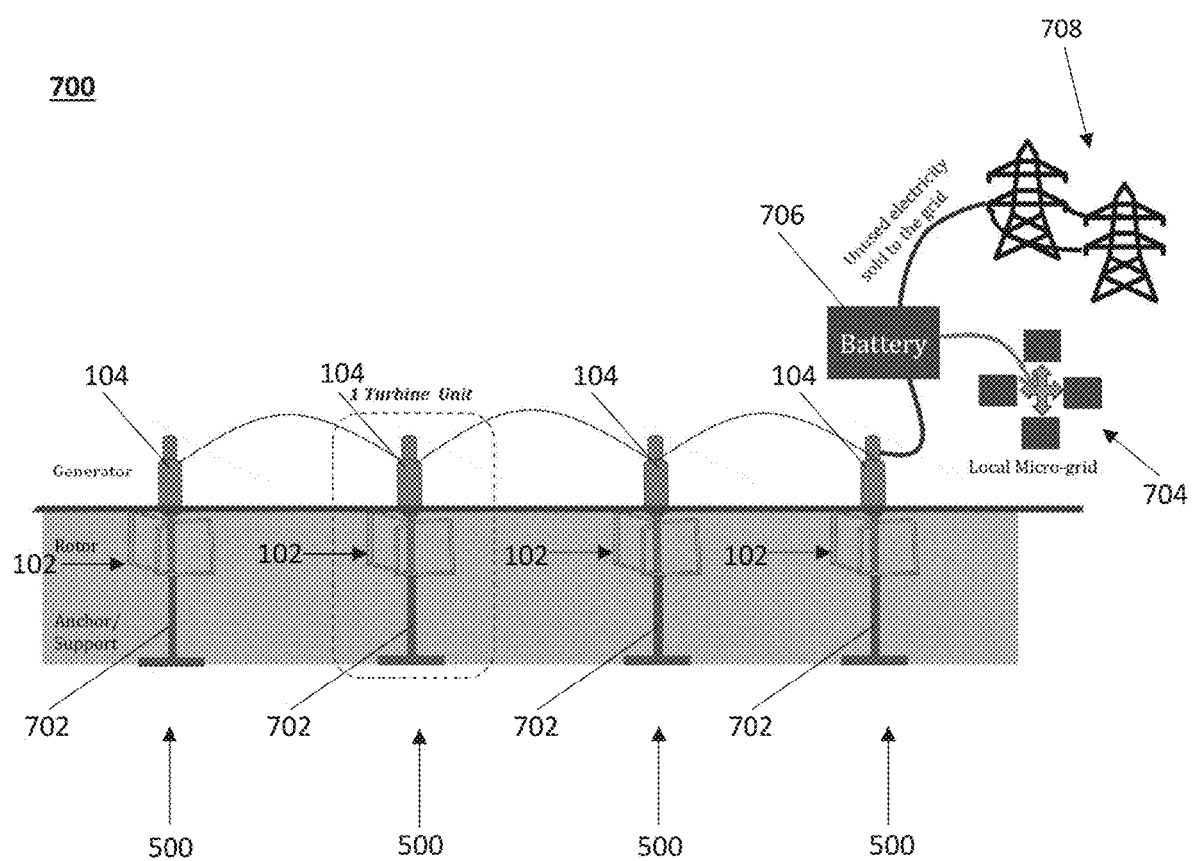
FIG. 18 illustrates a schematic representation of a multi-turbine power generation system in accordance with one embodiment of the present subject matter.

FIG. 18 illustrates a schematic representation of a multi-turbine power generation system 700 in accordance with one embodiment of the present subject matter. In the present system 700, multiple fluid turbines 500, each comprising one or more rotor blade assemblies 100, may be laid out to produce higher amounts of power. According to the present embodiment, the fluid turbines 500 comprise hydraulic turbines, each having its rotor blades 102 immersed in water and the generator 104 above the water surface. As shown herein, each fluid turbine 500 is mounted on the ground below water level by means of an anchor or support 702. The combined power generated by the fluid turbines 500 in the multi-turbine power generation system 700 may be supplied to a local micro-grid 704 and stored in a battery installation 706. The unused electricity stored in the battery installation 706 may be sold to the grid 708 in an embodiment.

While the preferred embodiments of the present invention have been described hereinabove, it should be understood that various changes, adaptations, and modifications may be made therein without departing from the spirit of the invention and the scope of the appended claims. It will be obvious to a person skilled in the art that the present invention may be embodied in other specific forms without departing from its spirit or essential characteristics. The described embodiments are to be considered in all respects only as illustrative and not restrictive.

I claim:

1. A rotor blade assembly for generating a lift in a fluid installation, the rotor blade assembly comprising
    an arcuate rotor blade configured to be rotated about its axis Y that extends through the arcuate rotor blade; and
    at least one motion transmitting member having an elongated geometry extending from the arcuate rotor blade in a direction generally parallel with the axis Y, the at least one motion transmitting member coupling the arcuate rotor blade to at least one power generating member, the at least one motion transmitting member configured to rotate about the axis Y for transmitting torque from the arcuate rotor blade to the at least one power generating member,
    wherein the arcuate rotor blade defines a concave surface that is the working surface of the arcuate rotor blade and a convex surface with which the at least one motion transmitting member is connected, wherein the axis Y is oriented generally normal to the concave surface and the convex surface of the arcuate rotor blade.

2. The rotor blade assembly as claimed in claim 1, wherein the arcuate rotor blade comprises an arcuate configuration extending from a stem section to a tip section.

3. The rotor blade assembly as claimed in claim 2, wherein the at least one motion transmitting member is attached at a point of intersection of a first section S1 and a second section S2 of the arcuate rotor blade.

4. The rotor blade assembly as claimed in claim 3, wherein the first section S1 comprises 34% of the arcuate length of the arcuate rotor blade extending from the stem section and the second section S2 comprises 66% of the arcuate length of the arcuate rotor blade extending from the tip section.

5. The rotor blade assembly as claimed in claim 4, wherein the widest section W of the arcuate rotor blade is provided at 34% distance from the stem section of the arcuate rotor blade.

6. The rotor blade assembly as claimed in claim 3, wherein the arcuate rotor blade comprises a plurality of leading edges L1, L2 and a plurality of trailing edges T1, T2 such that the first leading edge L1 and the first trailing edge T1 are formed in the second section S2 of the arcuate rotor blade, and the second leading edge L2 and the second trailing edge T2 are formed in the first section S1 of the arcuate rotor blade.

7. The rotor blade assembly of claim 6, wherein the arcuate rotor blade is configured to
cause the fluid to flow over the first leading edge L1 of the arcuate rotor blade towards a central rib R of the arcuate rotor blade;
cause the fluid to flow along the central rib R of the arcuate rotor blade towards the stem section of the arcuate rotor blade; and
cause the fluid to exit through the stem section of the arcuate rotor blade, thereby causing rotation of the arcuate rotor blade.

8. The rotor blade assembly as claimed in claim 1, wherein the arcuate rotor blade comprises a central rib R that separates the working surface of the arcuate rotor blade into a first side or Left-Hand Side LHS and a second side or Right-Hand Side RHS.

9. The rotor blade assembly as claimed in claim 8, wherein a camber angle C1 of the right-hand side RHS of the arcuate rotor blade is greater that a camber angle C2 of the left-hand side LHS of the arcuate rotor blade.

10. The rotor blade assembly as claimed in claim 1, wherein the at least one motion transmitting member comprises at least one rotatable main shaft connecting the convex surface of the arcuate rotor blade with the at least one power generating member, and one or more supplementary shafts connecting the convex surface of the arcuate rotor blade with the at least one rotatable main shaft.

11. The rotor blade assembly as claimed in claim 1, further comprises a plurality of veins V throughout the concave surface and the convex surface of the arcuate rotor blade.

12. A fluid turbine assembly comprising the rotor blade assembly as claimed in claim 1 aligned axially with a Darrieus Turbine, wherein the rotor blade assembly forms an inner rotor, and the Darrieus Turbine forms an outer rotor.

13. A multi-rotor fluid turbine assembly comprising a plurality of rotor blade assemblies as claimed in claim 1 mounted on a support plate, said support plate being connected with the at least one power generating member for transmitting torque to the at least one power generating member.

14. A multi-turbine power generation system comprising a plurality of fluid turbines, each fluid turbine comprising a rotor blade assembly as claimed in claim 1.

* * * * *